March 26, 1946. T. F. SCHLICKSUPP 2,397,374
DIFFERENTIAL GEARING
Filed Feb. 3, 1945 2 Sheets-Sheet 1

INVENTOR
THEODOR F. SCHLICKSUPP
BY
ATTORNEYS

March 26, 1946.  T. F. SCHLICKSUPP  2,397,374
DIFFERENTIAL GEARING
Filed Feb. 3, 1945    2 Sheets-Sheet 2
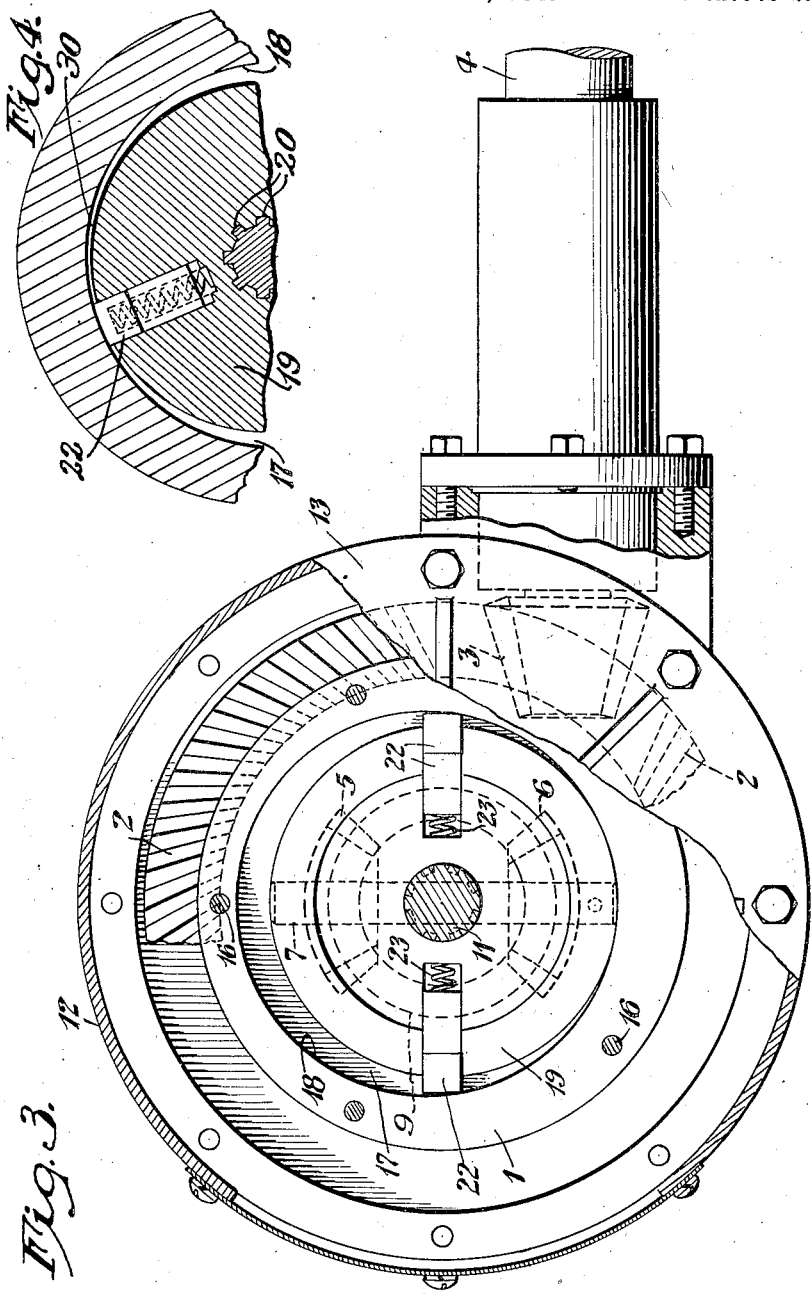
INVENTOR
THEODOR F. SCHLICKSUPP
BY
ATTORNEYS Patented Mar. 26, 1946

2,397,374

UNITED STATES PATENT OFFICE 2,397,374

DIFFERENTIAL GEARING

Theodor F. Schlicksupp, Long Island City, N. Y.

Application February 3, 1945, Serial No. 575,945

8 Claims. (Cl. 74—315)

This invention relates to improvements in differential gearing and more particularly to improvements in automobile differentials.

In practically all automobiles the engine drives a propeller shaft which in turn drives the two rear wheels through a differential at the rear axle. So long as both rear wheels have good traction on the ground so that the load on them is substantially the same, the differential properly carries out its intended function of transmitting and distributing power equally to the rear wheels while at the same time allowing one of them to turn faster than the other when the automobile makes a turn. However, if one of the rear wheels loses traction, the differential will not equally distribute power to the wheels but will rotate the wheel with lost traction at increased speed at the expense of power transmission to the other wheel. A familiar example of this is the refusal of an automobile to move, no matter how much the engine is speeded up, of one rear wheel happens to be resting on ice or snow and has thereby lost all of its traction and the other rear wheel is resting on the bare ground. The wheel that has lost all of its traction will, of course, slip and rotate freely without moving the automobile while the other one remains stationary, and the slipping wheel will spin fasten and faster if the engine is speeded up, but there will be practically no power transmission to the other wheel and therefore the automobile is stalled. Similarly, when an automobile is travelling on a rough road and one rear wheel bounces off the ground while the other maintains good traction on the road, the wheel that leaves the ground will momentarily rotate faster and power transmission to the other rear wheel will be momentarily reduced.

The principal object of this invention is to provide the differential of an automobile with equalizing means which will function automatically to prevent the rear wheel that has lost traction from spinning fast enough to materially lessen the power transmission to the other wheel.

If a braking action is applied to the rear automobile wheel that loses traction and tends to rotate at an abnormal speed at the expense of power transmission to the other rear wheel, the effect is the same as preserving some of its traction or load, so far as distribution of power to the two rear wheels by the differential is concerned, and therefore most of the other wheel's share of power will be preserved because each wheel's share in the power depends upon the load on the other wheel or the opposition offered to its turning. The present invention makes use of this braking principle.

According to the invention there is interposed between each rear wheel axle and the rotary differential gear box a hydraulic brake of a simple built-in character which functions automatically when the corresponding wheel loses traction to so oppose its rotation that it is prevented from spinning or rotating freely enough and fast enough to rob the other wheel of a substantial amount of power, the two brakes thus acting as an equalizer tending to maintain equal distribution of power to the two rear wheels at all times.

The accompanying drawings illustrate the differential of an automobile to which the invention in its preferred form has been applied. In the drawings:

Fig. 3 is a side elevation of the differential shown in Fig. 1, the side cover plate of the differential housing being broken away to expose some of the interior parts; and Fig. 4 is a partial transverse section corresponding to the section of Fig. 2 but illustrating a modified type of restricted passage through which the brake fluid flows.

Figure 1:
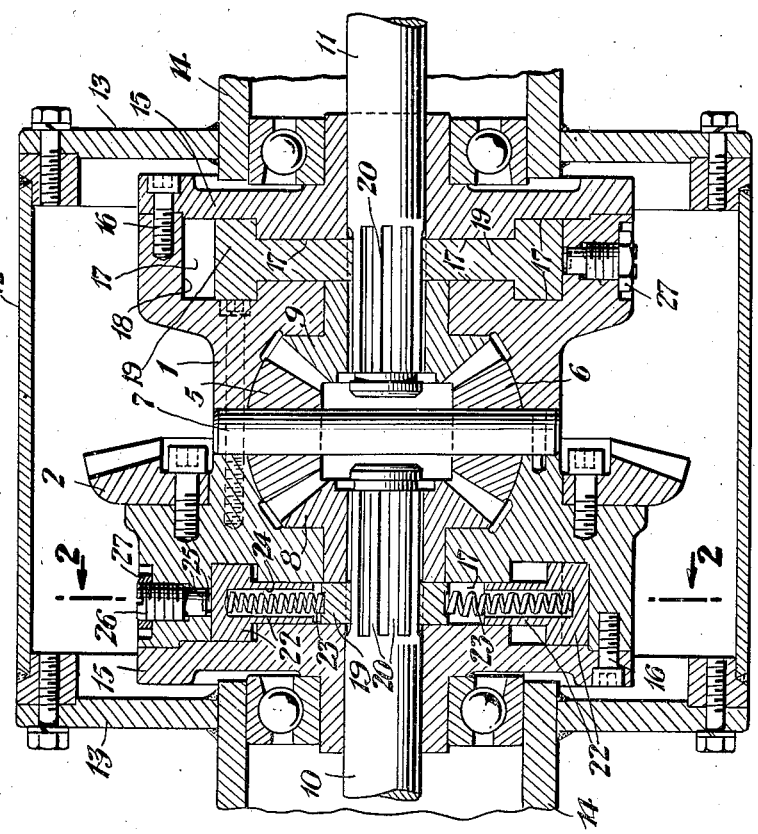
Fig. 1 is a vertical section through the differential taken in the plane of the rear axle.

Except for the modification necessary for incorportion of the invention, the differential may be of a standard type used on automobiles comprising the rotary differential gear box 1 to which is attached the bevel ring gear 2 (Fig. 1) driven by the pinion 3 (Fig. 3) at the rear end of the automobile propeller shaft 4. Within the differential box 1 are the usual differential pinions 5 and 6 mounted to rotate on a shaft 7 fixed in the differential box. The two differential pinions mesh with bevel gears 8 and 9 keyed, respectively, to the live axles 10 and 11 of the two rear automobile wheels (Fig. 1). A differential housing 12 has removable side plates 13, and along with the axle housings 14, completely encloses the interior parts of the differential and the live axles.

As is well understood, the propeller shaft rotates the differential box 1 through the pinion 3 on the propeller shaft and the ring gear 2 on the differential box. The differential pinions 5 and 6 revolve with the box 1 bodily about the axis of the wheel axles 10 and 11. Normally they do not turn on their shaft 7 and therefore they rotate the two axle gears 8 and 9 at the same speed and in unison with the differential box. When the automobile turns a corner the inner rear wheel, having a shorter distance to go in making the turn, slows down, but the outer wheel, having a longer distance to go, must speed up. The bevel gear 8 or 9 on the axle of the inner wheel also slows down but since the differential box 1 continues to rotate at the same speed, the differential pinions 5 and 6 now roll around on the slowed down axle gear and in doing so rotate about the axis of their shaft 7. This causes the bevel gear on the axle of the outer rear wheel to rotate that much faster and drive the outer wheel at the increased speed that is necessary in making its turn.

If one wheel loses all of its traction and can turn freely, no substantial amount of power will be transmitted to the other wheel because the differential pinions 5 and 6 can then turn freely on their shaft 7 and will merely roll around the axle-gear of the other wheel without trying to turn it, but due to their rotation on their shaft 7 will drive the axle-gear of the free-to-turn wheel at twice its normal speed (at a given engine speed). If the engine is speeded up it will only spin the free-to-turn wheel still faster with substantially no transmission of power to the wheel that has full traction. The amount of reduction in power transmission to the wheel with full traction depends, of course, on the amount of traction lost by the slipping wheel.

The braking mechanism that is added to the differential in accordance with the invention to prevent the wheel that has lost traction from rotating freely enough and fast enough to rob the other wheel of a substantial amount of power comprises, in its preferred form, a hydraulic brake interposed between each wheel axle and the rotary differential gear box, each of such hydraulic brakes working independently of the other.

Figure 2:
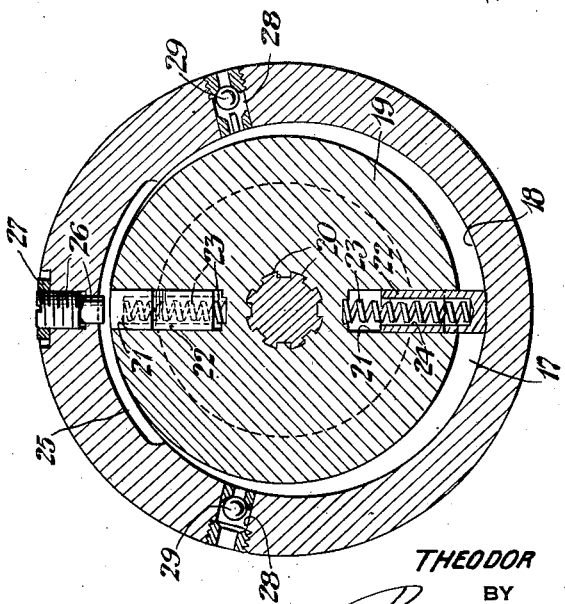
Fig. 2 is a transverse section taken on the line 2—2 of Fig. 1.

As best shown in Fig. 1, the rotary differential gear box 1 has separately formed side plates 15 secured to the gear box proper by means of bolts 16. The inner face of each side plate 15 and the opposing end face of the gear box proper are so shaped as to provide an intervening annular space 17, the outer peripheral portion of which is laterally enlarged. The outer peripheral wall 18 of the space 17 is eccentric with respect to the axis of the wheel axles 10 and 11. Within the space 17 is positioned a disc or vane body 19 having the cross-sectional shape shown at the right of Fig. 1, i. e. it has a central portion adapted to fit in the narrow part of space 17 and a laterally enlarged peripheral portion adapted to fit in the laterally enlarged peripheral portion of the space 17. Each of the discs 19 is keyed to the corresponding wheel axle by means of the keys or splines shown at 20, and each disc has a pair of oppositely disposed radial slots 21 (Fig. 2) which extend inwardly from the periphery of the disc and terminate short of its central opening through which the axle passes. In each slot 21 there is slidably mounted a vane 22 having the cross-sectional shape shown at the left of Fig. 1, i. e. it has a stem portion which slides in the portion of the slot in the narrow part of the disc and a laterally enlarged head portion which slides in the portion of the slot in the laterally enlarged peripheral part of the disc. Each vane is biased outwardly by a coil spring 23 which reacts at its inner end against the bottom of the corresponding slot in the disc and at its outer end against the vane itself. Preferably, each vane is drilled from its inner end to provide a bore 24 into which the spring extends and against the outer end of which the spring reacts.

The space 17 outwardly of the disc 19 forms an annular fluid chamber adapted to contain brake fluid. The outer peripheral face of the disc constitutes the inner wall of the annular chamber, and since the outer peripheral wall of the chamber is eccentric with respect to the peripheral face of the disc, the annular chamber has maximum radial width at one portion and tapers in opposite directions to a portion of reduced or minimum radial width, as clearly shown in Fig. 2. Along that portion of the outer peripheral of the annular chamber where the chamber is of reduced radial width there is provided a channel or groove 25 (Fig. 2) which forms a by-pass through which at least some of the fluid flows from the part of the annular chamber at one side of its portion of reduced radial width to the part at the other side thereof when the fluid is forced around in the chamber by the vanes 22, as hereinafter described. Passage of the fluid through the by-pass is controlled by an adjustable set screw 26 which may be locked in adjusted position by a lock nut 27. The inner end of the set screw projects into the by-pass and serves as an adjustable gate valve to control the amount of fluid that is allowed to flow through the by-pass.

The annular fluid chamber 17 may be filled with brake fluid, such as oil, through either of two intake passages 28, accessible from outside of the gear box and each of which leads to the interior of the annular fluid chamber. Each intake passage is controlled by a check-valve 29.

Normally, when the automobile is travelling along a straight course and both rear wheels have good traction on the ground, the two hydraulic brakes do not function because the differential gear box 1 and the discs 19 carrying the vanes move in unison and there is no relative rotation between them. Such relative rotation will occur only when one wheel rotates faster than the other, as when the automobile makes a turn, or when one of the rear wheels loses traction. At such times the relative rotation between the vanes and the corresponding fluid chamber in the gear box will cause the vanes to force the brake fluid in a circular path through the chamber and will force at least some of it through the restricted opening in the by-pass 25. It will be understood that during relative rotation between the vanes and the corresponding fluid chamber the outer ends of the vanes are kept in yielding contact with the eccentric outer peripheral wall 18 of the chamber. The set screw 26 is so adjusted that the speed of relative rotation between the vanes and the corresponding fluid chamber when the automobile makes a turn is not sufficient to cause any substantial or objectionable amount of braking effect on the faster turning rear wheel when the vanes rotating with it face the brake fluid through the corresponding restricted opening. However, if one of the rear wheels loses traction, its speed of rotation will ordinarily be such that the speed of relative rotation between its vanes and the corresponding fluid chamber will then be sufficient to cause the back pressure of the brake fluid, created as the vanes try to force the fluid through the restricted opening in the by-pass, to materially oppose the relative rotation of the vanes. Hence, the rotation of the wheel that loses traction will be opposed enough to preserve a substantial amount of the power transmitted to the other wheel as previously described. Thus, each hydraulic brake functions to oppose rotation of the corresponding rear wheel in increasing amount as the speed of relative rotation between its axle and the rotary differential gear box increases, so that when such speed of relative rotation reaches a certain level, as when one of the rear wheels loses traction, the amount of braking effect on the wheel with lost traction is sufficient to preserve most of the normal power transmission to the other wheel. This considerably lessens the danger of the automobile becoming stalled if one rear wheel is resting on ice or snow while the other is resting on bare ground, or if one of them is resting on a more slippery surface than the other, and also eliminates or lessens loss of tractive effort by one of the rear wheels if the other bounces off the road surface when the automobile is travelling on a rough road.

Under some circumstances the by-pass 25 could probably be omitted and a small clearance at the narrowest part of the fluid chamber could be used as the restricted braking passage through which the brake fluid is forced by the vanes as shown at 30 in Fig. 4, but the use of a groove or channel, such as that which constitutes the by-pass 25, is desirable because it permits the use of the regulating set screw 26 which projects into the groove or channel but not into the path of the rotating vanes.

While the invention has been described as applied to the differential at the rear axle of an automobile, and the drive wheels have been referred to as "rear wheels," it should be understood that the drive wheels might be any pair of the automobile wheels that are driven through a differential, even the front wheels if the automobile happens to be one of the front drive type. In fact, the improvements herein described, although particularly useful in connection with the differential of an automobile, may be used in combination with any differential gearing in which power is transmitted to the differential gear box to rotate the same and is distributed to two output shafts corresponding to the drive wheel axles of an automobile and where load conditions on the shafts make it desirable to apply a braking action to either shaft when it tends to rotate too fast, because of decreased load on it, at the expense of power transmission to the other shaft.

I claim:

1. The combination with an automobile differential having a rotary gear box and differential pinions carried thereby meshing with bevel gears on the axles of the drive wheels, of a hydraulic brake interposed between each drive wheel axle and the differential gear box, each of such brakes comprising an annular fluid chamber in the differential gear box, a brake fluid therein, means rotating with the corresponding wheel axle for moving the fluid around in the chamber in a circular path when the axle rotates relatively to the gear box, and a restricted passage through which at least some of the fluid in said chamber must flow in passing from one portion of the chamber to another.

2. The combination with an automobile differential having a rotary gear box and differential pinions carried thereby meshing with bevel gears on the axles of the drive wheels, of a hydraulic brake interposed between each drive wheel axle and the differential gear box, each of such brakes comprising an annular fluid chamber in the differential gear box, a brake fluid therein, means rotating with the corresponding wheel axle for moving the fluid around in the chamber in a circular path when the axle rotates relatively to the gear box, a restricted passage through which at least some of the fluid in said chamber must flow in passing from one portion of the chamber to another, and a check-valve controlled passage accessible from outside of the gear box through which braking fluid can be introduced into the fluid chamber.

3. The combination with an automobile differential having a rotary gear box and differential pinions carried thereby meshing with bevel gears on the axles of the drive wheels, of a hydraulic brake interposed between each drive wheel axle and the differential gear box, each of such brakes comprising an annular fluid chamber in the differential gear box, a brake fluid therein, at least one vane projecting into said chamber, means operatively connecting the vane with the corresponding wheel axle whereby the vane is moved around the fluid chamber by the axle and forces the brake fluid around the chamber in a circular path when the axle rotates relatively to the gear box, the outer peripheral wall of said chamber being eccentric with respect to its inner wall whereby one portion of the chamber has reduced radial width, and a restricted by-pass permitting at least some of the fluid to flow from the region of the chamber at one side of its portion of reduced width to the region at the other side thereof.

4. The combination with an automobile differential having a rotary gear box and differential pinions carried thereby meshing with bevel gears on the axles of the drive wheels, of a hydraulic brake interposed between each drive wheel axle and the differential gear box, each of such brakes comprising an annular fluid chamber in the differential gear box, a brake fluid therein, at least one vane projecting into said chamber, means operatively connecting the vane with the corresponding wheel axle whereby the vane is moved around the fluid chamber by the axle and forces the brake fluid around the chamber in a circular path when the axle rotates relatively to the gear box, the outer peripheral wall of said chamber being eccentric with respect to its inner wall whereby one portion of the chamber has reduced radial width, a restricted by-pass permitting at least some of the fluid to flow from the region of the chamber at one side of its portion of reduced width to the region at the other side thereof, and adjustable valve means controlling said by-pass.

5. The combination with an automobile differential having a rotary gear box and differential pinions carried thereby meshing with bevel gears on the axles of the drive wheels, of a hydraulic brake interposed between each drive wheel axle and the differential gear box, each of such brakes comprising an annular fluid chamber in the differential gear box, a brake fluid therein, at least one vane projecting into said chamber, means operatively connecting the vane with the corresponding wheel axle whereby the vane is moved around the fluid chamber by the axle and forces the brake fluid around the chamber in a circular path when the axle rotates relatively to the gear box, the outer peripheral wall of said chamber being eccentric with respect to its inner wall whereby one portion of the chamber has reduced radial width, means yieldingly urging the vane outwardly to maintain its outer end in contact with the eccentric outer peripheral wall of the fluid chamber, and a restricted by-pass permitting at least some of the fluid to flow from the region of the chamber at one side of its portion of reduced width to the region at the other side thereof.

6. The combination with an automobile differential having a rotary gear box and differential pinions carried thereby meshing with bevel gears on the axles of the drive wheels, of a hydraulic brake interposed between each drive wheel axle and the differential gear box, each of such brakes comprising an annular fluid chamber in the differential gear box, a brake fluid therein, a vane-carrying body keyed to the corresponding wheel axle, at least one vane mounted in said body for movement thereby around the fluid chamber when the axle rotates relatively to the gear box, the outer peripheral wall of said chamber being eccentric with respect to its inner wall whereby one portion of the chamber has reduced radial width, means yieldingly urging the vane outwardly in the vane body to maintain its outer end in contact with the eccentric outer peripheral wall of the fluid chamber, and a restricted by-pass permitting at least some of the fluid to flow from the region of the chamber at one side of its portion of reduced width to the region at the other side thereof.

7. The combination as set forth in claim 6 having adjustable valve means controlling said by-pass.

8. The combination as set forth in claim 6 having adjustable valve means controlling said by-pass, and a check-valve controlled passage accessible from outside of the gear box through which brake fluid can be introduced into the fluid chamber.

THEODOR F. SCHLICKSUPP.